May 20, 1969   G. W. BARTLEY   3,444,964
TRACK BRAKING SYSTEM
Filed March 2, 1967   Sheet 2 of 3

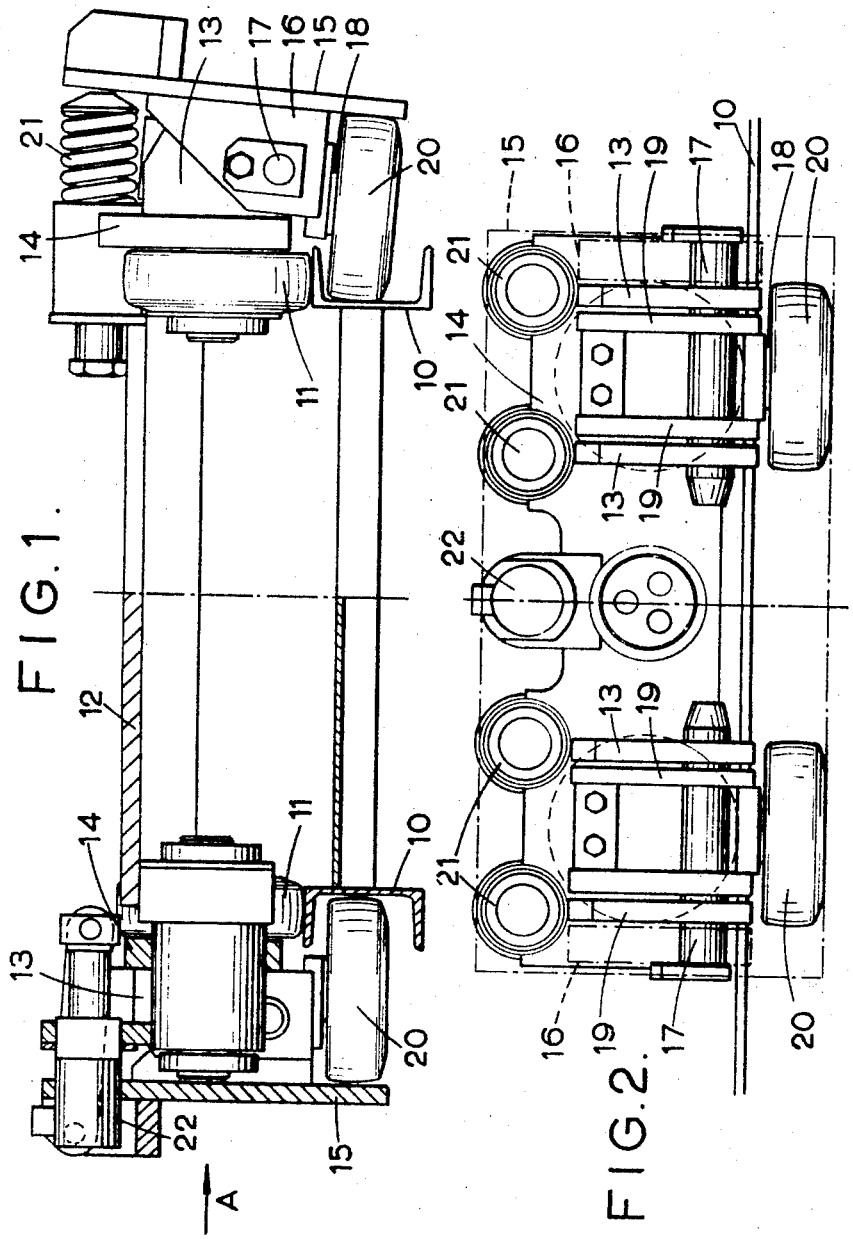

INVENTOR
George Wells Bartley
BY
Watson, Cole, Grindle & Watson
ATTORNEYS

United States Patent Office 3,444,964
Patented May 20, 1969

3,444,964
TRACK BRAKING SYSTEM
George Wells Bartley, Newton Aycliffe, England, assignor to Underground Mining Machinery Limited, near Darlington, Durham County, England, a British company
Filed Mar. 2, 1967, Ser. No. 620,079
Claims priority, application Great Britain, Mar. 16, 1966, 11,425/66
Int. Cl. B61h *13/12, 7/00*
U.S. Cl. 188—39                                6 Claims

ABSTRACT OF THE DISCLOSURE

A braking system for a vehicle with load-bearing wheels and guide wheels engaging two rails forming a track for the vehicle. The braking system acts solely on the guide wheels and utilizes flat plates to urge the guide wheels against vertical walls of the rail by trapping the guide wheels between the vertical walls and the plates. The guide wheels should continue to rotate during braking and to achieve this the frictional force developed between the periphery of the guide wheels and the vertical walls of the rails is made greater than the frictional force developed between the periphery of the guide wheels and the flat plates.

---

Figure 3:
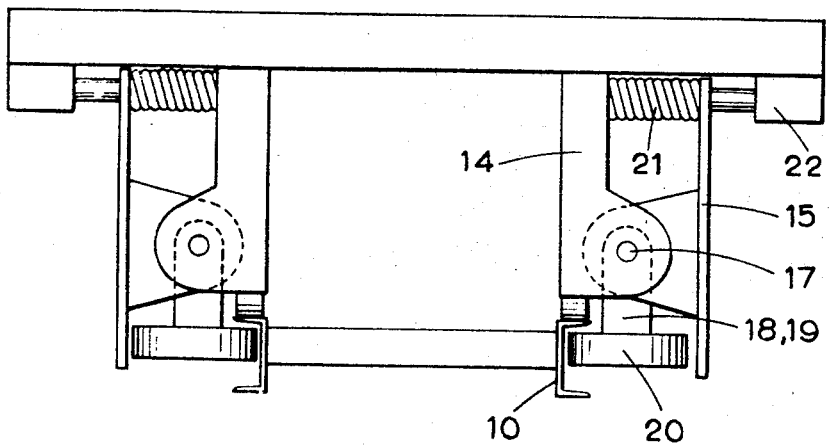

This invention relates to a braking system for a rail-borne or rail-guided vehicle. The invention is of particular utility in connection with vehicles for use in mine workings, and may be applied to single or double track arrangements, and to vehicles which run on tracks mounted on the ground or on overhead tracks.

A major problems in designing braking systems for rail-borne or rail-guided vehicles is that the rate of wear of brake lining materials tends to be rapid and uneven. In one braking system which is commercially employed at the present time the load bearing wheels of the vehicle are provided with a tyre of suitable brake lining material such as a polychloroprene rubber and the vehicle is arrested by bringing a braking surface into contact with the wheels so as to brake the wheel. In this system however the wheels tend to become locked on contact with the movable braking surface and as a result the tire of the wheel becomes unevenly worn and wear is very rapid.

The present invention is based on the discovery that if a wheel is braked in such a way that the wheel continues to rotate until the vehicle is brought to a halt, the rate of wear will be reduced to a minimum and the braking surface will be worn evenly.

According to the present invention there is provided a braking system for a rail-borne or rail-guided vehicle in which a rotatable wheel is mounted on the vehicle between a rail and a surface which is movable relatively to the wheel to trap the wheel between the rail and the surface and thus to apply a braking force to the wheel, the arrangement being such that during braking the frictional force developed between the movable surface and the wheel is less than the frictional force developed between the wheel and the rail. As a result the wheel will continue to rotate on the track until the vehicle is brought to a halt.

The present invention also provides a method of braking a rail-borne or rail-guided vehicle which comprises trapping a rotatable wheel mounted on the vehicle between a surface and a rail until the vehicle is brought to a halt.

One method of ensuring that the frictional force developed between the movable surface and the wheel is less than the frictional force developed between the wheel and the rail is to select a movable surface which is of such a nature that the coefficient of friction between itself and the wheel is less than the coefficient of friction between the surface of the wheel and the rail.

Alternatively the objective may be achieved by providing first means for urging the movable surface against the wheel and second means for urging the wheel against the rail, said wheel being movable into and out of engagement with the rail so that during braking the total reaction between the wheel and the rail is equal to the sum of the forces exerted by the first and second means.

Preferably the wheel is provided with a tyre of suitable high friction material such as a chloroprene rubber tyre and the movable surface is preferably a flat plate which is pivotable into and out of engagement with the wheel.

Conveniently the wheel is not a load bearing wheel and is mounted on a shaft which is pivotable so as to allow the wheel to be moved into and out of engagement with the rail. With this arrangement and, where the rail is channel-shaped, the wheel may be arranged to run inside the channel and thus serve to guide or assist in guidance of the vehicle on the rail.

As a safety factor the braking system may be made "fail-safe" by spring urging the movable surface into engagement with the wheel and providing some means such as a hydraulic or pneumatic cylinder for restraining the spring when the brake is not in operation.

Figure 4:
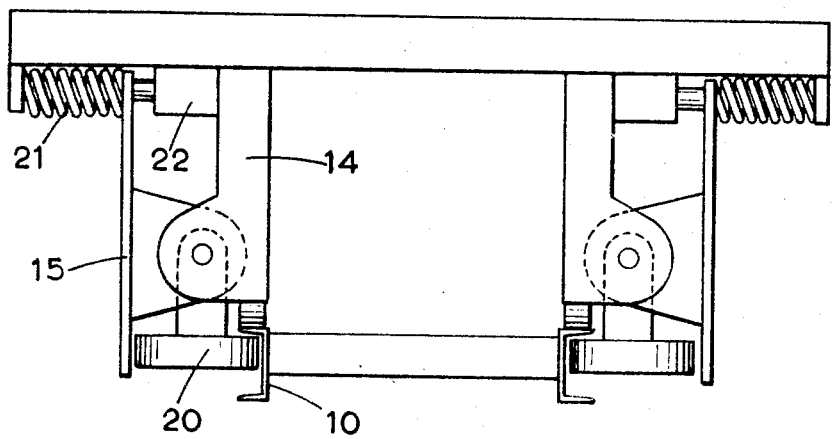
Figure 5:
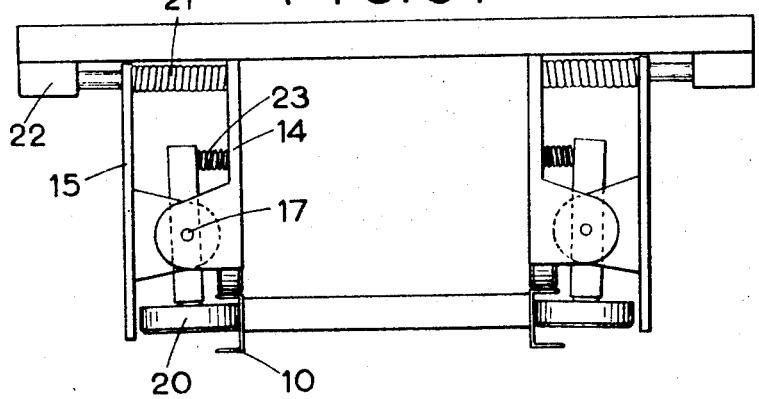
Figure 6:
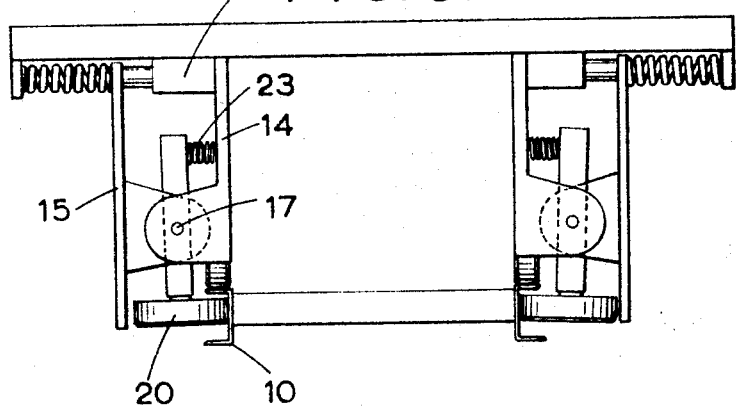

In order to illustrate the invention several embodiments of the braking system in accordance with the invention will now be described with reference to the accompanying drawings in which:

FIGURE 1 is an end elevation of one embodiment, partly in section,

FIGURE 2 is a side elevation of the system shown in FIGURE 1 taken in the direction of arrow A with the brake plate removed, FIGURE 3 is a diagrammatic end view of the embodiment shown in FIGURES 1 and 2, FIGURE 4 is a diagrammatic end view of a second embodiment, FIGURE 5 is a diagrammatic end view of a third embodiment in accordance with the invention, and FIGURE 6 is a diagrammatic end view of a fourth embodiment.

Referring to the drawings, FIGURES 1, 2 and 3 show a track for a vehicle comprising two rails 10. On each rail run tired running wheels 11 mounted on a bogie frame 12. The frame is approximately square and carries two pairs of running wheels 11. Brackets 13 project outwardly of each side frame 14 of the bogie frame 12, and are rigidly attached to the frame 14.

The brackets 13 carry the brake assemblies and each brake assembly consists of a brake plate 15, which is secured to a bracket 16 and bracket 16 is pivotably mounted on a pivot pin 17 carried by bracket 13. Also mounted on each of the pivot pins 17 is a bracket 19 which is pivotable on the pin 17 independently of bracket 16. The brackets 19 each support a vertically disposed shaft 18 on the end of which a wheel 20 is rotatably mounted. In this embodiment, the wheels 20 run in the side channel of rails 10 and serve as is commonly required in the mining field, as guides to keep the vehicles on the track. It will be seen that each wheel 20 lies between the rail 10 and the brake plate 15. The wheels are tired wheels and preferably the tire is a polychloroprene rubber (e.g., the material sold under the trade mark "Neoprene") bonded to the metal of the wheel.

On each side of the bogie frame 12 are a series of, in this case four, brake springs 21 which are compression springs mounted on the top of the side frame 14 so as to exert, if not restrained, an outwardly directed force on the top of the brake plates 15. This has the effect of causing the brake plate 15 and shaft 18 to pivot about pin 17, thus trapping the wheel 20 between the rail 10 and the brake plate 15. This situation is shown in the right hand side of FIGURE 1.

Also located midway along the length between the side frame 14 and the brake assembly is an hydraulic cylinder 22. The cylinder in its energized state operates to draw the upper edge of the brake plate 15 inwardly, so counteracting the effect of springs 21. The left hand side of FIGURE 1 shows the situation in which the hydraulic cylinder 22 is charged. The wheel 20 is then free to rotate between the rail 10 and the brake plate 15.

In operation, the hydraulic cylinders 22 are pressurized and the brake plates 15 remain parallel with the side frames 14. When it is required to brake the bogie, or in the event of a breakdown of the hydraulic system, the hydraulic cylinders 22 are de-pressurized and the brake springs 21 operate to push the upper parts of the brake plates 15 outwardly. This pivots the plates 15 about pin 17, thus trapping the side wheels 20 between the plate and the track 10. The wheels 20 continue to rotate but are heavily braked. In the embodiments shown in FIGURES 1 to 4, the coefficient of friction between the brake plate 15 and the wheel 20 is designed to be less than that between the rail 10 and the wheel 20, thus ensuring that the side wheels do not skid on the rail.

The sytsem shown in FIGURES 1, 2 and 3 is essentially "fail-safe." A similar but less satisfactory arrangement is shown schematically in FIGURE 4. FIGURE 4 shows a system which is essentially the same as that shown in FIGURES 1, 2 and 3 except for the manner of actuating the brakes and similar reference numerals are used for similar parts. In the arrangement shown in FIGURE 4, the brakes must be positively applied by the hydraulic cylinders 22 against the pressure of the brake springs 21. However, failure of the hydraulic system renders the braking useless. This is therefore a correspondingly less useful arrangement.

The braking mechanism is fitted to both sides of the bogie thus giving an equal braking effort on each side. The cylinders may of course be pneumatically, vacuum or electrically operated. The control of all bogies will normally be effected centrally on the vehicle, and may include a centrifugal governor, driven indirectly by the running wheels, set to trip at a pre-determined speed and thereby actuate the braking system. In normal use the braking system will be hand operated by any convenient control means of known kind.

FIGURES 5 and 6 show schematically embodiments of the braking system which differ from those shown in FIGURES 1 to 4 in that the guide wheels 20 are continuously held in contact with the rails 10 by means of springs 23 which act between the free end of the shaft 18 and the side frame 14. In other respects the arrangement shown in FIGURES 5 and 6 are identical to the arrangements shown in FIGURES 1 to 4 and the same reference numerals have been used to indicate the same components.

It will be appreciated that the effect of the spring 23 is to apply a constant force urging the associated guide wheel into contact with its rail 10. Let this force be X lbs. weight. When the brakes are applied, the spring 21 exerts a force against the guide wheel 20 equal to Y lbs. weight. It will thus be appreciated that the total force exerted on the rail 10 when the brakes are applied will be equal to the total forces applied by springs 21 and 23, i.e. $(X+Y)$ lbs. weight.

The embodiment shown in FIGURE 6 differs from that shown in FIGURE 5 only in that FIGURE 5 shows a "fail-safe" arrangement similar to that shown in FIGURE 3 and FIGURE 6 shows an arrangement similar to that shown in FIGURE 4 in which the brakes are applied by operating the cylinder 22.

I claim:
1. In the combination of a vehicle having a frame carrying vertically-disposed load-bearing wheels and generally horizontally-disposed guide wheels the rotational axes of which are laterally displaceable relative to said frame and a track in the form of two single parallel rails each having one wall extending horizontally and another adjoining wall extending vertically, the load bearing wheels engaging upon the uppermost surface of the horizontal walls of the rails the improvement comprising the guide wheels being disposed with a part of their peripheries adjacent the vertical walls of the rails and a braking system comprising:
  (a) flat plates which are pivotably mounted and generally vertically disposed adjacent the part of the periphery of the guide wheels remote from the rails,
  (b) first power means acting to move the flat plates into engagement with the guide wheels to urge the latter against the vertical walls of the rails whereby to brake the vehicle, and
  (c) second power means arranged to oppose and overcome said action of said first power means during the non-braking condition.

2. The combination of claim 1 further comprising spring means biasing the guide wheels into engagement with the vertical walls of the rails.

3. The combination of claim 1 wherein said first power means is a pressure medium operated piston and cylinder unit and said second power means is a compression spring.

4. The combination of claim 1, wherein said first power means is a compression spring and said second power means is a pressure medium operated piston and cylinder unit.

5. In the combination of a vehicle having a frame carrying vertically-disposed load-bearing wheels and generally horizontally-disposed guide wheels the rotational axes of which are laterally displaceable relative to said frame and a track in the form of two single parallel rails each having one wall extending horizontally and another adjoining wall extending vertically, the load bearing wheels engaging upon the uppermost surface of the horizontal walls of the rails the improvement comprising the guide wheels being disposed with a part of their peripheries adjacent the vertical walls of the rails and a braking system comprising:
  (a) flat plates which are pivotably mounted and generally vertically disposed adjacent the part of the periphery of the guide wheels remote from the rails,
  (b) first power means acting to move the flat plates into engagement with the guide wheels to urge the latter against the vertical walls of the rails to brake the vehicle, the coefficient of friction between each plate and the periphery of its associated guide wheel being less than the coefficient of friction between the periphery of the guide wheel and the vertical wall of the rail against which it is urged; and
  (c) second power means arranged to oppose and overcome said action of said first power means during the non-braking condition.

6. In the combination of a vehicle having a frame carrying vertically-disposed load-bearing wheels and generally horizontally-disposed guide wheels the rotational axes of which are laterally displaceable relative to said frame and a track in the form of two single parallel rails each having one wall extending horizontally and another adjoining wall extending vertically, the load bearing wheels engaging upon the uppermost surface of the horizontal walls of the rails the improvement comprising the guide wheels being disposed with a part of their peripheries adjacent the vertical walls of the rails and a braking system comprising;
  (a) flat plates which are pivotably mounted and generally vertically disposed adjacent the part of the periphery of the guide wheels remote from the rails;
  (b) first power means acting to move the flat plates into engagement with the guide wheels to urge the latter against the vertical walls of the rails whereby to brake the vehicle;

(c) second power means arranged to oppose and overcome said action of said first power means during the non-braking condition; and (d) spring means biasing the guide wheels into engagement with the vertical walls of the rails so that during braking the frictional force developed between each of the flat plates and its associated guide wheel is less than the frictional force developed between the guide wheel and the vertical wall of the rail which it engages.

References Cited

UNITED STATES PATENTS

| | | | |
|---|---|---|---|
| 863,193 | 8/1907 | Lockett | 188—39 |
| 2,856,030 | 10/1958 | Snow | 188—43 |
| 3,240,291 | 3/1966 | Bingham | 188—33 |

DUANE A. REGER, *Primary Examiner.*

U.S. Cl. X.R.

188—41